(12) United States Patent
Jarisch et al.

(10) Patent No.: US 11,134,807 B2
(45) Date of Patent: Oct. 5, 2021

(54) FROTHING DEVICE

(71) Applicant: NESTEC S.A., Vevey (CH)

(72) Inventors: Christian Jarisch, Lutry (CH); Nicolas Camier, Brignais (FR)

(73) Assignee: Societe des Produits Nestle S.A., Vevey (CH)

( * ) Notice: Subject to any disclaimer, the term of this patent is extended or adjusted under 35 U.S.C. 154(b) by 360 days.

(21) Appl. No.: 15/762,676

(22) PCT Filed: Sep. 22, 2016

(86) PCT No.: PCT/EP2016/072603
§ 371 (c)(1),
(2) Date: Mar. 23, 2018

(87) PCT Pub. No.: WO2017/050933
PCT Pub. Date: Mar. 30, 2017

(65) Prior Publication Data
US 2018/0263409 A1 Sep. 20, 2018

(30) Foreign Application Priority Data
Sep. 25, 2015 (EP) .................................... 15186795

(51) Int. Cl.
*A47J 31/44* (2006.01)
(52) U.S. Cl.
CPC ....... *A47J 31/4485* (2013.01); *A47J 31/4489* (2013.01)
(58) Field of Classification Search
CPC ..................... A47J 31/4485; A47J 31/4489
See application file for complete search history.

(56) References Cited

U.S. PATENT DOCUMENTS

| | | | | |
|---|---|---|---|---|
| 5,473,972 | A | * 12/1995 | Rizzuto | A47J 31/4403 99/290 |
| 6,192,785 | B1 | * 2/2001 | Trida | A47J 31/41 99/275 |

(Continued)

FOREIGN PATENT DOCUMENTS

| | | |
|---|---|---|
| AU | 646379 B3 | 2/1994 |
| CN | 102083347 A | 6/2011 |

(Continued)

OTHER PUBLICATIONS

Chinese Office Action for Patent Appl No. 201680054347.1 dated Jan. 3, 2020.

(Continued)

*Primary Examiner* — Christopher M Koehler
(74) *Attorney, Agent, or Firm* — K&L Gates LLP

(57) ABSTRACT

Frothing device (40) for the use in a machine (100) for foaming and/or heating a fluid, comprising at least a first body (15) and a second body (16) assembled together to configure the frothing device (40); at least one of the first or second bodies (15, 16) comprising cavities to configure fluid conduits when the bodies (15, 16) are assembled together; the fluid conduits comprising a steam conduit (21) through which steam flows and heats the fluid; a fluid conduit (28) though which fluid flows by the under-pressure created when steam circulates through the steam conduit (28); and an air conduit (22) configured to be able to add air to the fluid conduit (28); the fluid conduits further comprising an expansion chamber (18) having an internal restriction in section allowing the fluid to be frothed when air has been added to the fluid conduit (28). The invention further refers to a machine (100) for foaming and/or heating a fluid by means of such a frothing device (40), comprising means for receiving and closing in a tight manner the two bodies (15, 16) configuring the frothing device (40) when the frothing (Continued)

device (40) is arranged in the machine (100) so that a closed fluid system using Venturi effect is created, these means for receiving and closing the two bodies (15, 16) preferably being also configured to refrigerate the frothing device (40) when arranged in the machine (100).

14 Claims, 23 Drawing Sheets

(56) References Cited

U.S. PATENT DOCUMENTS

| | | | |
|---|---|---|---|
| 8,113,107 B2* | 2/2012 | Fraij | A47J 31/4485 99/279 |
| 9,320,384 B2* | 4/2016 | Remo | A47J 31/60 |
| 2003/0079612 A1* | 5/2003 | Con | A47J 31/4485 99/275 |
| 2014/0044847 A1* | 2/2014 | Hellmaier | B01F 15/00019 426/474 |

FOREIGN PATENT DOCUMENTS

| | | |
|---|---|---|
| CN | 103315631 A | 9/2013 |
| DE | 102010028729 A1 | 11/2011 |
| DE | 102013108621 | 2/2015 |
| EP | 1688075 | 8/2006 |
| WO | 2014029422 | 2/2014 |

OTHER PUBLICATIONS

China Patent Office Communication for Application No. 201680054347.1, dated Apr. 9, 2021, 16 pages.

* cited by examiner

FROTHING DEVICE

CROSS REFERENCE TO RELATED APPLICATIONS

The present application is a National Stage of International Application No. PCT/EP2016/072603, filed on Sep. 22, 2016, which claims priority to European Patent Application No. 15186795.9, filed on Sep. 25, 2015, the entire contents of which are being incorporated herein by reference.

FIELD OF THE INVENTION

The present invention relates to a frothing device to be used in a fluid foaming machine, particularly in a milk foaming machine, the frothing device being configured to be very easy to clean and having a simplified configuration.

BACKGROUND OF THE INVENTION

Devices for frothing milk, particularly for frothing hot milk, are known in the state of the art, such as for example those applied in coffee machines, where the frothed hot milk is added at the end of the beverage preparation. In these known devices, the Venturi principle is commonly used, where hot water vapor flows under pressure through a first pipe, this first pipe being connected to a second pipe such that, as vapor flows through this first pipe, an under-pressure is generated in the second pipe. Typically, the second pipe is connected to a fluid container, typically to a milk container, such that the under-pressure in the second pipe allows sucking of milk through this second pipe and into the first pipe. Typically, the first pipe leads to an expansion chamber where milk froth is generated by rapid expansion and by the hot water vapor.

Commonly, the problem of these known frothing devices is cleanability, particularly due to hygienic reasons as they use milk as conduit fluid. These frothing devices are not easily accessible and require long and complicated cleaning operations which need to be done very often so that the milk remaining inside them does not deteriorate.

Document U.S. 2006/0113408 A1 belonging to the same applicant discloses for example a nozzle adaptable to the steam outlet of a coffee machine: the nozzle is made from a single piece and is designed to froth a liquid by addition of air and steam. The problem of such a known solution is that it had to be disassembled from the apparatus in order to be properly cleaned. Moreover, it is also possible that milk can clog the air entry, which has a very small section.

Document U.S. 2014/0044847 A1 in the state of the art discloses a reusable milk frother comprising two parts that can be separated by being twisted or by sliding one with respect to the other or that comprise a hinge joining them. The frother comprises a primary channel through which hot vapor flows and that is mixed with milk in an expansion chamber, the milk coming from a secondary channel, the mixture being frothed in the expansion chamber. Vapor flowing in the primary channel generates an under-pressure in the secondary channel allowing milk sucking through Venturi effect. Even when the cleanability of the device is easier as the device is configured in two parts that can be separated from each other for cleaning operations, the problem in such a device is that a vortex effect in the expansion chamber is needed in order to obtain frothing, and this is not happening in a highly controlled way which makes that repeatability of the process is not attained and foaming results are not always satisfactory.

Therefore, it is an object of the present invention to provide a frothing device that is reusable and that can be easily accessible for being cleaned, providing at the same time high quality foaming in a controlled and in a repeatable manner. The invention also aims at other objects and particularly at the solution of other problems as will appear in the rest of the present description.

SUMMARY OF THE INVENTION

According to a first aspect, the invention refers to a frothing device for the use in a machine for foaming and/or heating a fluid, comprising at least a first body and a second body assembled together to configure the frothing device; where at least one of the first or second bodies comprises cavities to configure fluid conduits when the bodies are assembled together; the fluid conduits comprising a steam conduit through which steam flows and heats the fluid; a fluid conduit though which fluid flows by the under-pressure created when steam circulates through the steam conduit; and an air conduit configured to be able to add air to the fluid conduit; the fluid conduits further comprising an expansion chamber having an internal restriction in section allowing the fluid to be frothed when air has been added to the fluid conduit.

Preferably, the fluid conduit further comprises an aspiration tube through which the fluid is conveyed into the fluid conduit, the aspiration tube being configured by cavities in at least one of the first and/or second bodies when assembled together to configure the frothing device. According to another embodiment, the aspiration tube is a separate tube connected to the fluid conduit, preferably made of a flexible material.

Typically, the bodies are joined by means of a joining element allowing folding and unfolding of the said bodies a plurality of times. Preferably, the joining element is configured as a hinge and can further comprise one or a plurality of clamping elements.

The bodies are typically configured as halves comprising complementary cavities that constitute the fluid conduits when brought together.

The frothing device of the invention preferably further comprises a sealing part configured to allow tight joining of the two bodies together, preferably made of a flexible material such as rubber or silicon.

The sealing part can be either molded onto one of the two bodies or it can be inserted separately in one of them.

According to a second aspect, the invention refers to a machine for foaming and/or heating a fluid by means of a frothing device as the one described, comprising means for receiving and closing in a tight manner the two bodies configuring the frothing device when the frothing device is arranged in the machine so that a closed fluid system using Venturi effect is created.

Preferably, the means for receiving and closing the two bodies are also configured to refrigerate the frothing device when arranged in the machine.

Typically, the machine comprises a valve controlling the air entry into the air conduit of the frothing device, such that this air entry can also be totally closed when only hot fluid, not frothed, is targeted.

According to another embodiment, the machine can comprise a plurality of means being able to receive one or a plurality of frothing devices that can work simultaneously and/or sequentially.

Preferably, the machine of the invention comprises means to respectively inject steam and air into the steam and air conduits when the frothing device is arranged in the machine.

Typically, the machine further comprises a frothing cover arranged at the outlet of the frothing device when the device is arranged in the machine, the cover being configured to prevent splashes on the machine housing during beverage preparation.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1A:
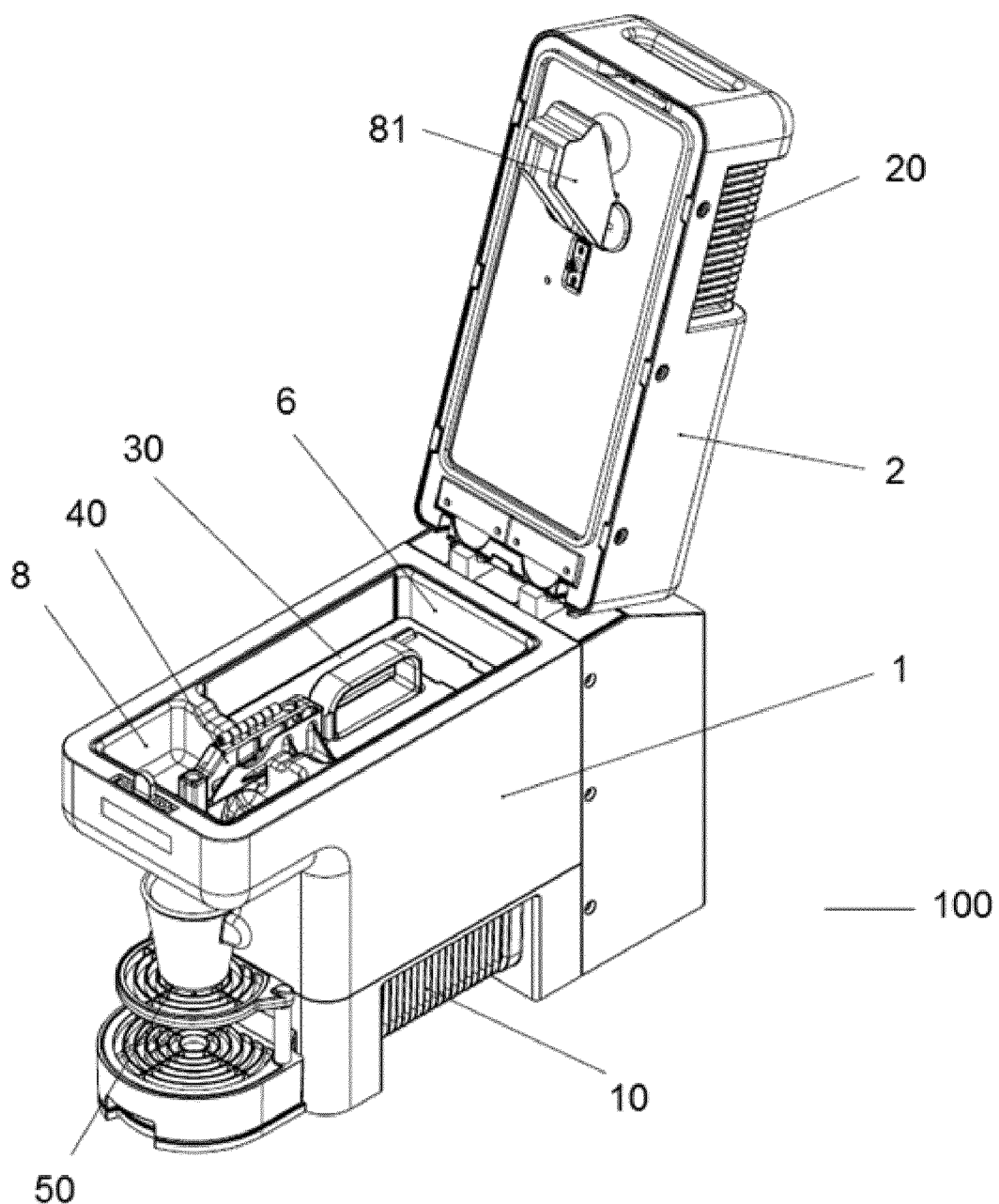
FIGS. 1a-b show views of a fluid foaming machine in an open position (FIG. 1a) and in a closed position (FIG. 1b), where the frothing device of the present invention is used.
Figure 1B:
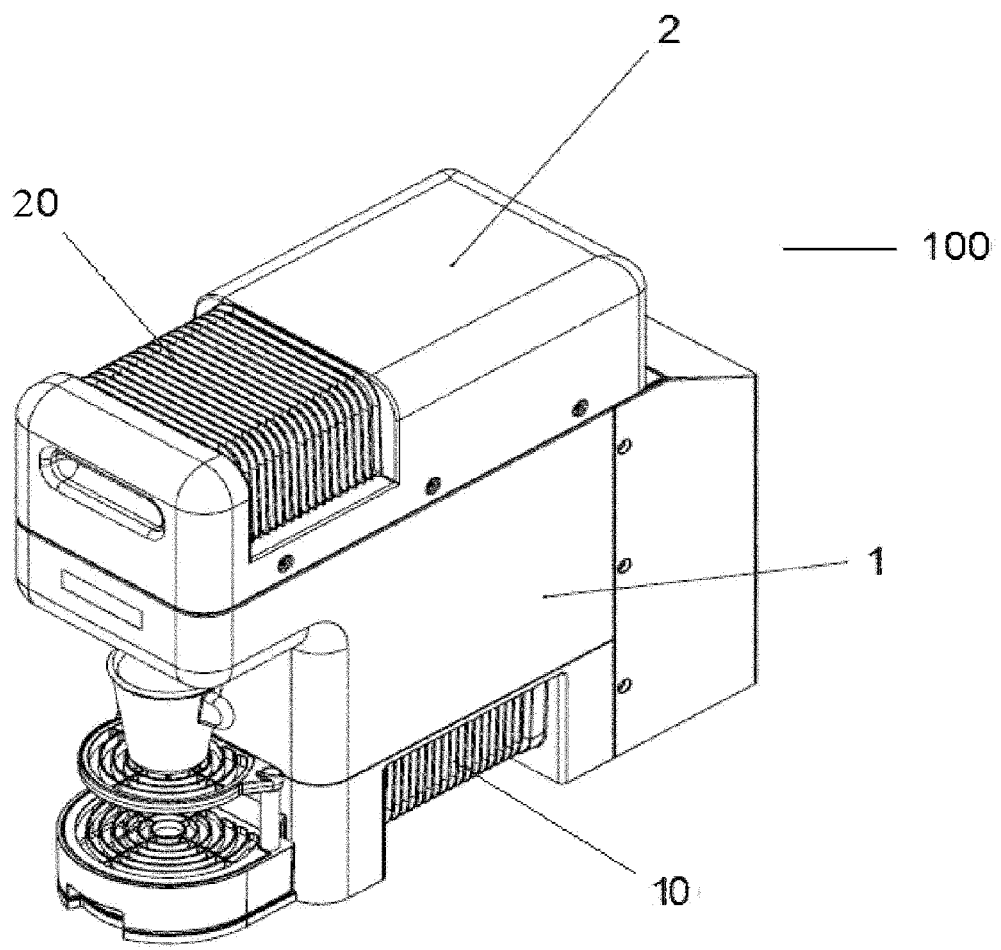

FIGS. 1a and 1b represent a fluid foaming machine 100 able to provide hot fluid or hot fluid foam where a frothing device 40 according to the present invention is arranged and used, as it will be further explained in detail. In the following, the description of the present invention is given in view of foaming of milk. However, the invention is not limited to milk as a fluid, but can also be applied to other fluids, e.g. chocolate, coffee, etc. Consequently, other foams different to milk foam can be achieved according to the present invention as well. When talking about milk in the present invention, it should be understood not only pure milk but also milk-based fluids having a major weight proportion of pure milk. Also in the present invention, frothing, foaming or whipping should be understood as synonyms.

Referring now to FIGS. 1a and 1b, a complete fluid foaming machine 100 comprising a frothing device 40 is represented, shown in an open and a closed position, respectively. As shown in FIG. 1a, the opening of the machine 100 is done on the top, which is particularly advantageous as it reduces the temperature increase of the fluid during filling of it into the fluid container 30. As shown in FIG. 1a, the machine 100 comprises a machine housing 1 having a primary refrigerated compartment 6 where a fluid container 30 can be inserted together with its associated frothing device 40. The frothing device 40 is placed in a secondary refrigerated compartment 8 in order to keep the temperature cold at the fluid outlet. Both primary and secondary refrigerated compartments 6, 8 are accessible via a top opening 2 reducing the cold temperature loss to a minimum. The machine 100 preferably comprises two separated cooling units: a first cooling unit 10 refrigerating the primary refrigerated compartment 6 where the fluid container 30 is inserted, and a second cooling unit 20 refrigerating the secondary refrigerated compartment 8 in contact with the frothing device 40. According to such embodiment, the fluid is maintained refrigerated when it is stored in the container 30 and until it has actually been foamed and it is delivered through the outlet. Also as represented in FIG. 1a, the machine 100 preferably further comprises a dispensing area 50 adjustable in height and configured for different cup sizes.

Figure 2A:
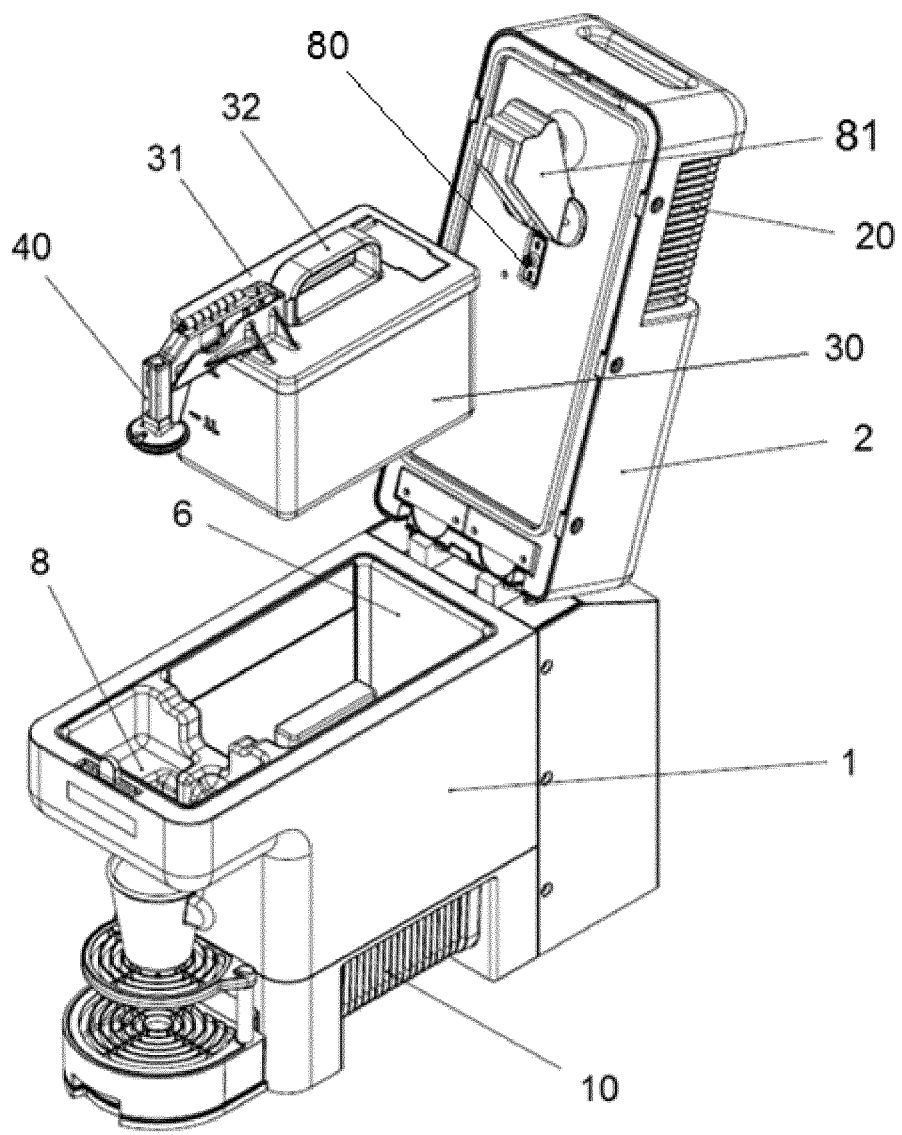
FIGS. 2a-b show detailed views of a fluid foaming machine where the frothing device of the present invention is used, in an open position, showing the fluid container and its refrigeration in the machine.
Figure 2B:
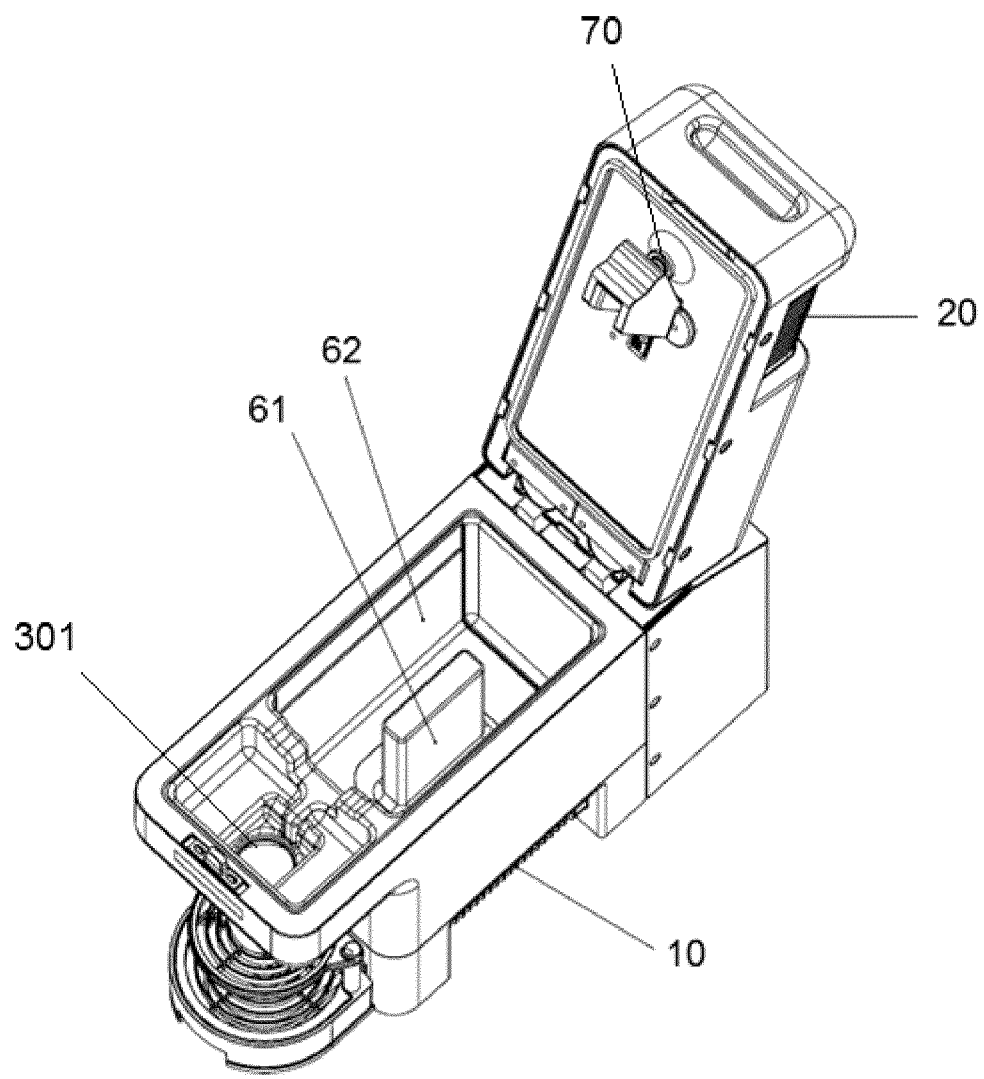

Referring now to FIGS. 2a and 2b, the insertion of the fluid container 30 together with the frothing device 40 is shown in detail. Typically, the fluid container 30 comprises a cover 31 with a handle 32 for allowing an easy insertion and removal of the mentioned container 30. FIG. 2b shows a second view with the primary refrigerated compartment 6 without the fluid container 30 having been inserted. In order to better cool the fluid, typically milk, the fluid container 30 comprises a cavity 33, typically arranged in the middle (see FIG. 3d or 3e for example) cooperating with a dedicated cooling block 61 in the primary refrigerated compartment 6 and connected to the first cooling unit 10. Furthermore, the cooling block 61 is welded together with a metallic sheet that covers the cooling walls 62 of the primary refrigerated compartment 6. This configuration allows a better and more homogeneous cooling of the fluid inside the fluid container 30. Preferably, the cooling block 61 is arranged centred in the primary refrigerated compartment 6, and so is the cavity 33 in the container 30: this configuration is particularly advantageous as it accelerates cooling of the fluid in the container 30 as it is done from the centre of the fluid towards the exterior of it.

FIGS. 3a to 3e show detailed views of the fluid container 30 in the machine 100, showing the container as such and the frothing device 40, the only parts that are in contact with the fluid and that have to be cleaned regularly, typically once a day. According to the invention, these components do not need an automatic rinsing system integrated into the machine, as they are completely removable and can be easily cleaned. Furthermore, the container assembly remains very simple, as the whole fluid system is permanently refrigerated.

Figure 3A:
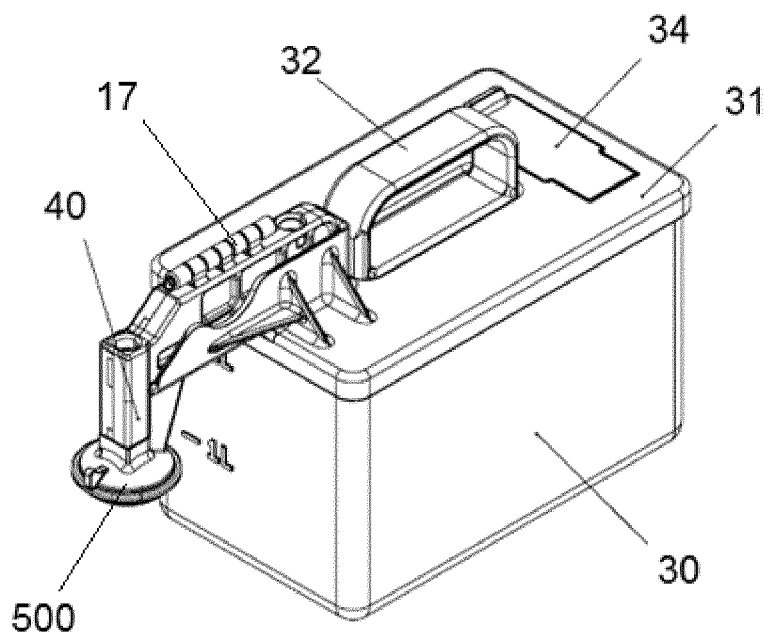
FIGS. 3a-e show different views of the fluid container together with the frothing device of the present invention.
Figure 3B:
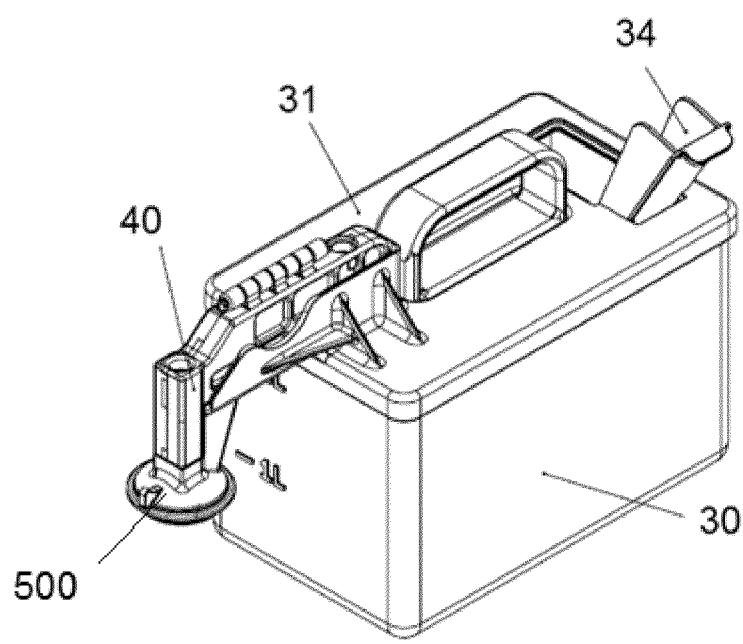

FIGS. 3a and 3b show the fluid container 30 with a top cover 31, a handle 32 and also comprising a filling inlet 34, typically arranged in the top cover 31, used for inserting fluid into the container 30 without removing the container from the machine. The top cover 31 is configured to hold and retain in place the frothing device 40.

Figure 3C:
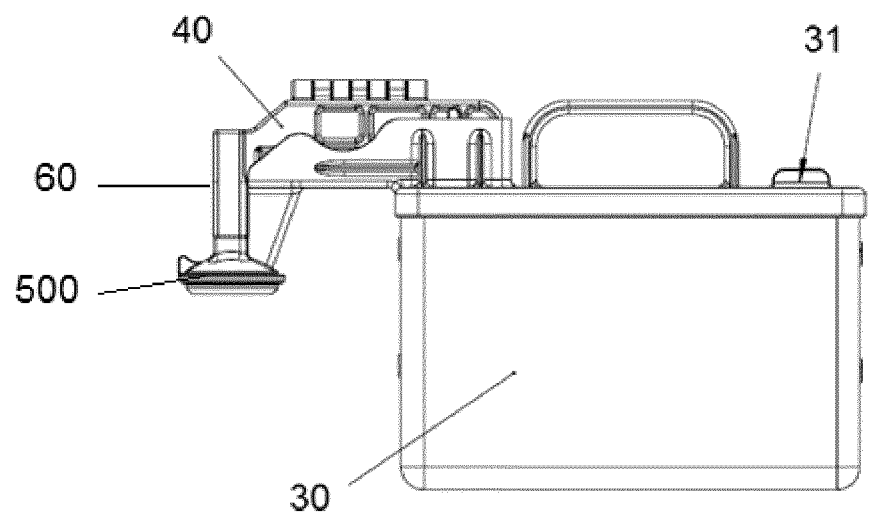
Figure 3D:
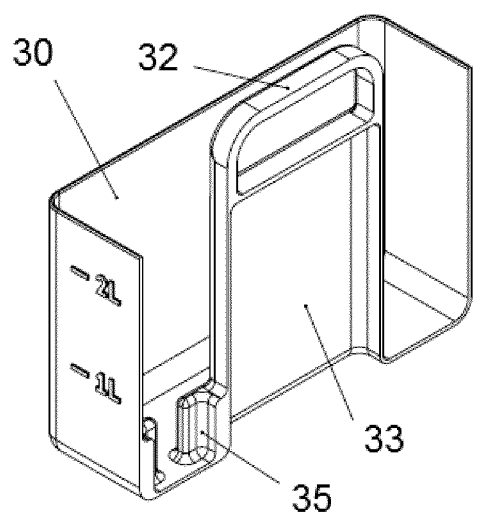

The cut view of the fluid container 30 in FIG. 3*d* shows the cavity where the cooling block 61 will be arranged, the handle 32 and an integrated guide part 35 for holding and retaining in place the frothing device 40.

Foaming or frothing takes place in the frothing device 40, as it will be further explained which is configured to constitute a closed fluid (milk) system using Venturi technology. Looking in more detail at FIG. 11*b*, the fluid (typically milk) is sucked from the fluid container 30 through a fluid conduit 28 by Venturi effect through injection of steam by a steam conduit 21. Air is also added in a controlled manner through an air conduit 22 controlled by a solenoid valve 36 (comprising also electronics) arranged in the cover 31 of the machine 100.

By acting on the valve 36, it is possible to add air to the fluid in order to foam it, adding more or less quantity of air depending on the foaming characteristics targeted, or not adding any air at all. Once steam is not injected any more, the remaining fluid in the frothing device 40 flows back to the fluid container 30. The air conduit 22 is connected to the valve 36 and to a controlled air hole having a diameter typically of 0.2 mm. The dimension of this air hole is such that optimised fluid foam is obtained. For milk foam, the air conduit 22 is connected to the air hole; for hot milk, the valve 36 is closed, so the air supply is cut to the frothing device 40. By controlling this air hole to 0.2 mm, the quantity of air injected is controlled so that proper foaming is achieved.

Moreover, the air conduit 22 in the frothing device 40 of the invention has a certain length so that eventual milk remaining in it and rising towards the machine will never be able to reach the machine, so that no contamination of fixed parts of the machine can possibly occur: eventual remaining of milk will always stay in the frothing device 40, that can be unfolded for being easily cleaned, so hygiene is always maintained.

The frothing device 40 of the invention is therefore configured to work in such a way that, once it is closed and arranged in the machine 100 (further explanation on this will follow), steam is injected into the steam conduit 21: by Venturi effect, milk is sucked through the fluid conduit 28. The air conduit 22 is adding a controlled amount of air to the fluid (milk) to be foamed thanks to it being controlled by the valve 36 arranged in the machine cover. Foaming takes place in the expansion chamber 18 by rapid expansion and by the hot water vapour, as it can be seen in FIGS. 11*b* and 12*b*. When the valve 36 is closed, no air is added through the air conduit 22 so only hot milk (not foamed) is dispensed. Once steam is cut, remaining milk flows back to the container 30.

Figure 11A:
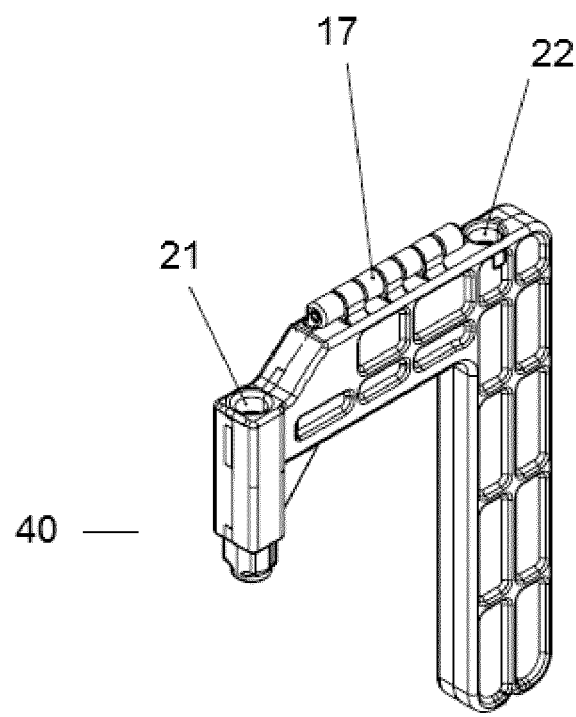
FIGS. 11a-b show a frothing device in a closed position (FIG. 11a) and in an open position (FIG. 11b) according to a first preferred embodiment of the present invention.
Figure 11B:
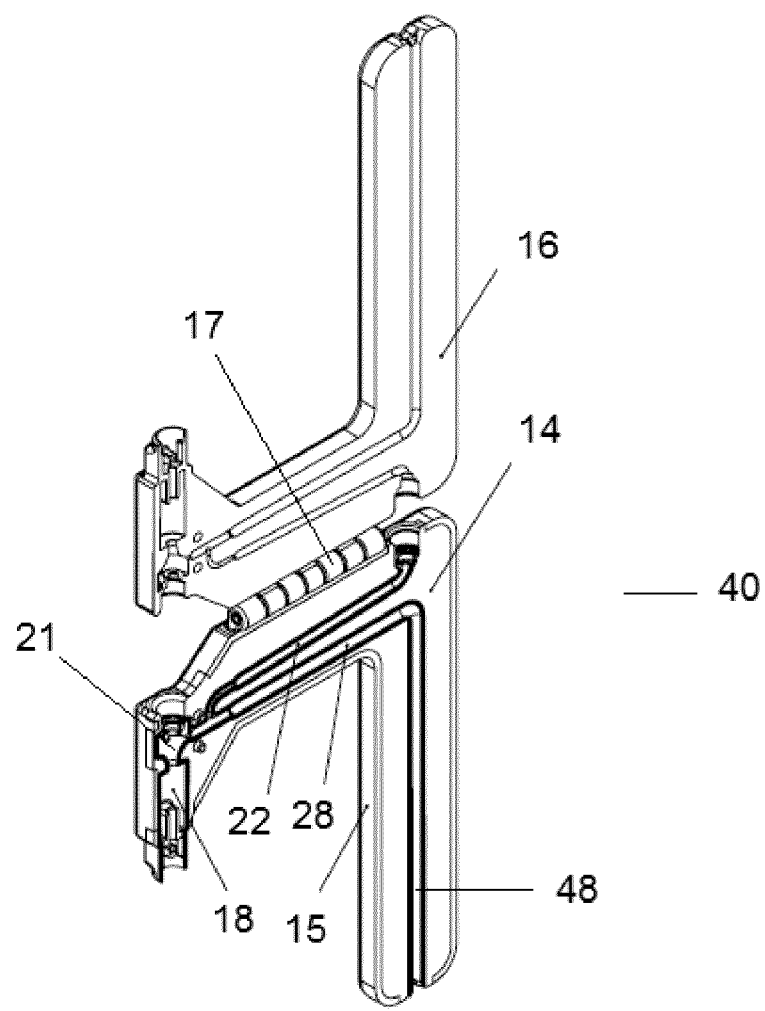

FIGS. 11*ab* and 12*ab* show in detail the configuration of the frothing device 40 of the present invention, according to two possible embodiments. Preferably, the frothing device 40 is made reusable and foldable, the fact of being made foldable allowing very easy cleaning. The frothing device 40 is typically made of two parts, a first body 15 and a second body 16, typically a first half 15 and a second half 16, typically joined by means of a joining element 17 preferably a hinge such that when put together, form the complete frothing device 40. The frothing device 40 further comprises a sealing part 14, typically made in rubber or silicon, helping the proper joining of the two halves 15, 16. The sealing part 14 can be over moulded onto one of the two halves 15, 16 or it can be inserted separately. In operational mode, the two halves 15, 16 are folded together and maintained joined thanks to the sealing part 14, creating a closed milk fluid system using Venturi technology. Once unfolded, which can be easily done thanks to the hinge element 17, the device 40 can be easily cleaned as it is made accessible by being deployed (it can be cleaned by using water, directly from the tap, for example, or even in the dishwasher). Each of the halves 15, 16 comprises cavities at its surface such that when the halves are brought together, the cavities configure the air conduit 22, the fluid conduit 28 and the expansion chamber 18.

Preferably, the joining element 17 will be configured as a hinge: however, other embodiments are also possible, such as clamps or other means allowing rapid and easy opening and closing of the two bodies of the frothing device 40.

Figure 12A:
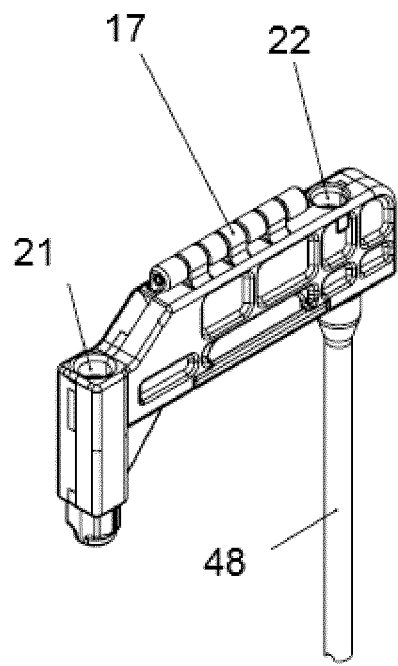
FIGS. 12a-b show a frothing device in a closed position (FIG. 11a) and in an open position (FIG. 11b) according to a second preferred embodiment of the present invention.
Figure 12B:
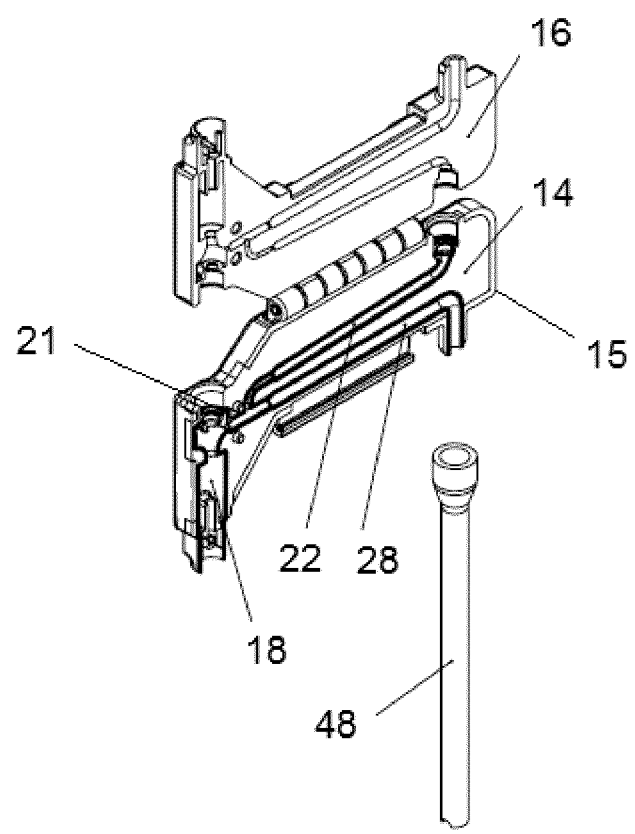

A different embodiment of the frothing device 40 of the invention is shown in FIGS. 12*ab*, now comprising a separate aspiration tube or pipe 48 that is connected to the fluid conduit 28 that is made smaller in this embodiment, as seen in FIG. 12*b*. The aspiration tube 48 is connected to the fluid container 30 and sucks the fluid by the Venturi effect when steam is injected in the steam conduit 21. Aspiration of milk is done through the tube 48 and milk is then canalized through the rest of the fluid conduit 28 toward the expansion chamber 18. This embodiment allows that the tolerances in the configuration of the cavities in the frothing device 40 are less tight or strict, so it is easily configured. Typically, the pipe 48 is made flexible, preferably made of silicone.

As represented in FIG. 12*b*, the expansion chamber 18 is made essentially cylindrically, comprising a first section that is then strongly reduced and then again greatly expanded so that frothing can occur through these abrupt changes in section.

When the frothing device 40 is arranged in the machine 100, it is tightly held in place (i.e. the two halves 15, 16 are tightly maintained together so that a closed milk fluid system using Venturi technology is created) by means of a metallic cooling block 81 (also refrigerating the frothing device 40) and further by a foaming receiver 90. The fact that the block 81 is further cooled is important as it maintains the milk inside and the possible milk remaining inside the device refrigerated, which eliminates all kind of hygienic problems. The metallic cooling block 81 assures tightness and permanent refrigeration of the frothing device 40.

Figure 6:
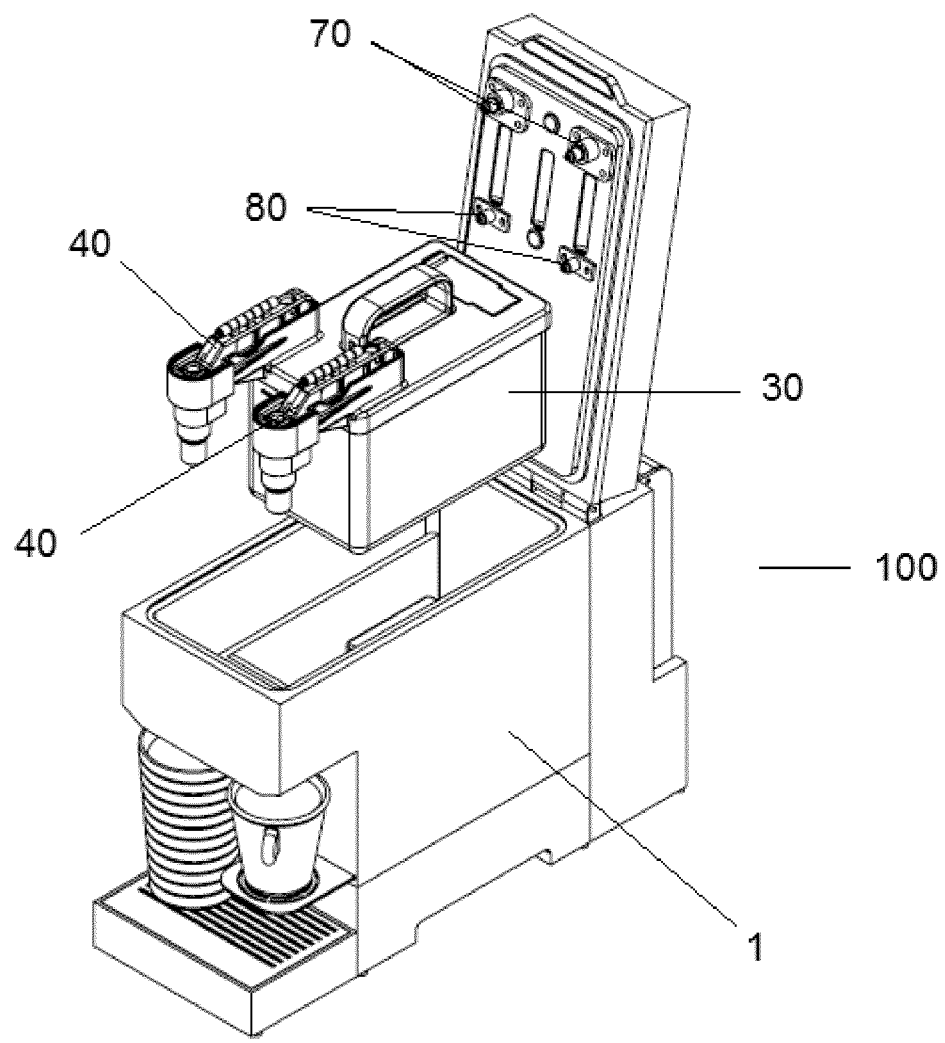
FIG. 6 shows another embodiment of a fluid foaming machine configured to receive two frothing devices according to the present invention.
Figure 7A:
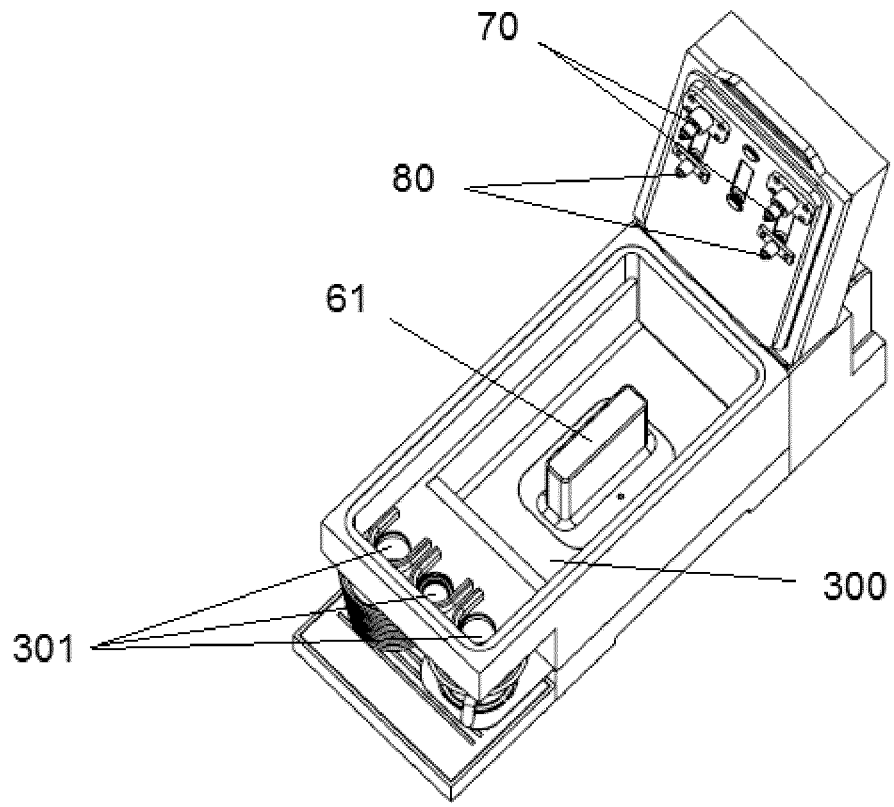
FIGS. 7a-c show another possible embodiment of a fluid foaming machine configured to receive three frothing devices according to the present invention.
Figure 7B:
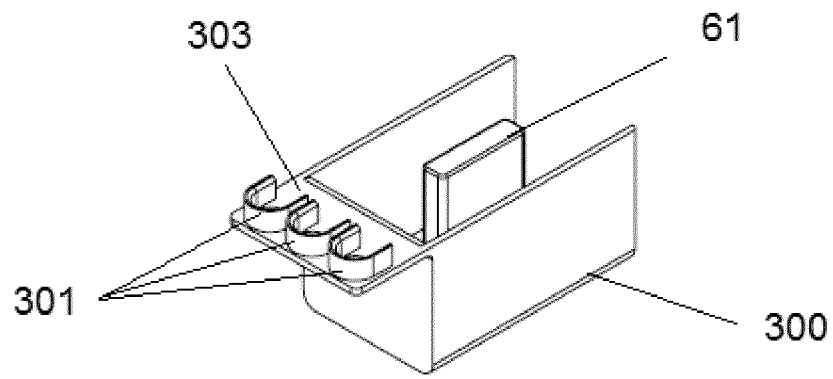
Figure 8A:
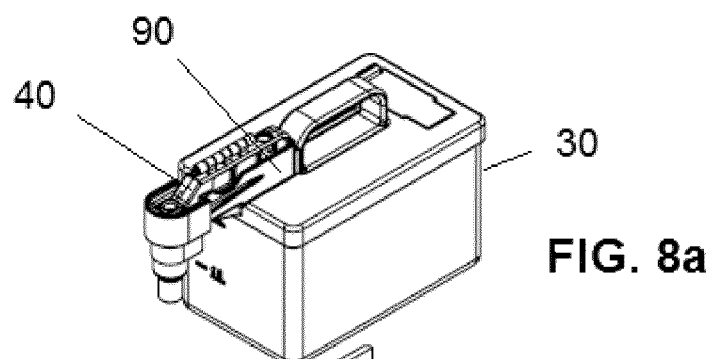
FIGS. 8a-c show an embodiment of a fluid foaming machine comprising one frothing device according to the present invention.
Figure 8B:
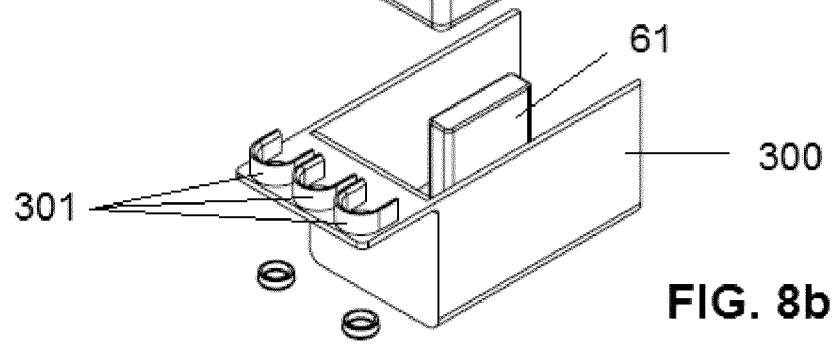
Figure 8C:
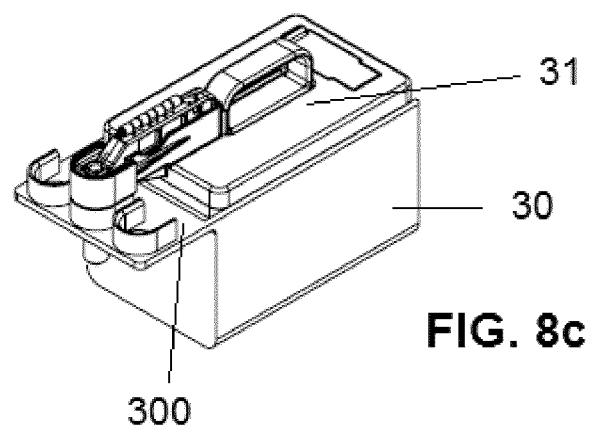
Figure 9A:
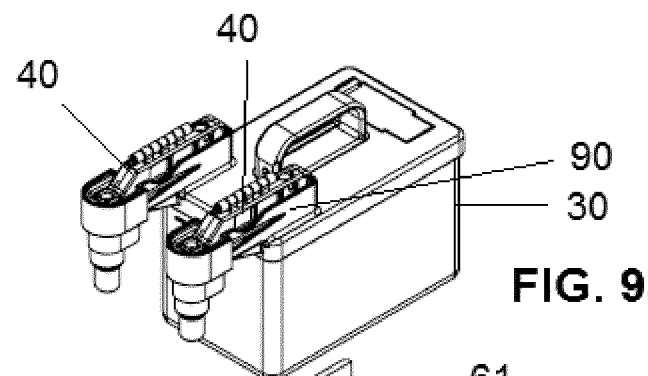
FIGS. 9a-c show an embodiment of a fluid foaming machine comprising two frothing devices according to the present invention.
Figure 9B:
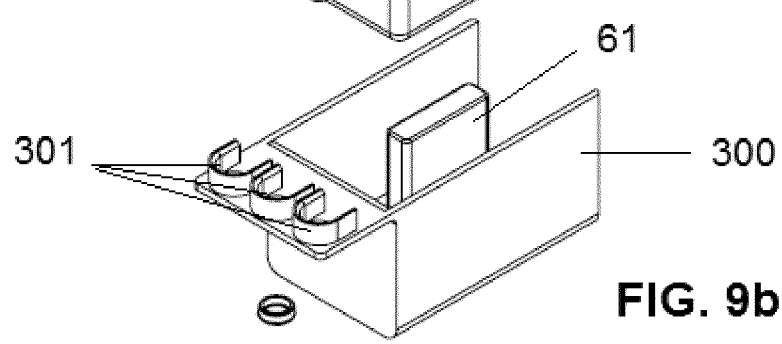
Figure 9C:
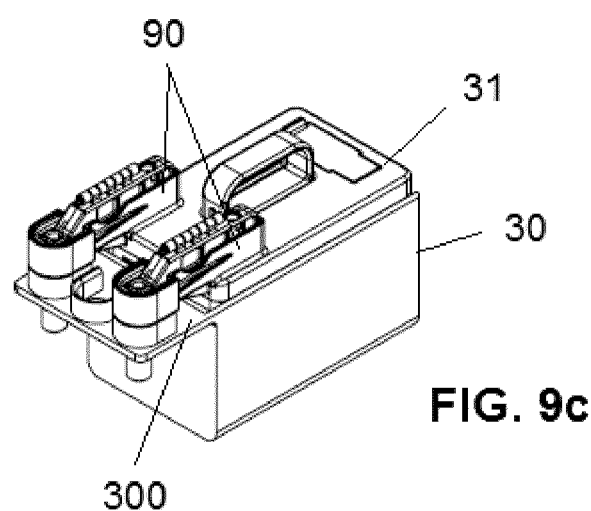
Figure 10A:
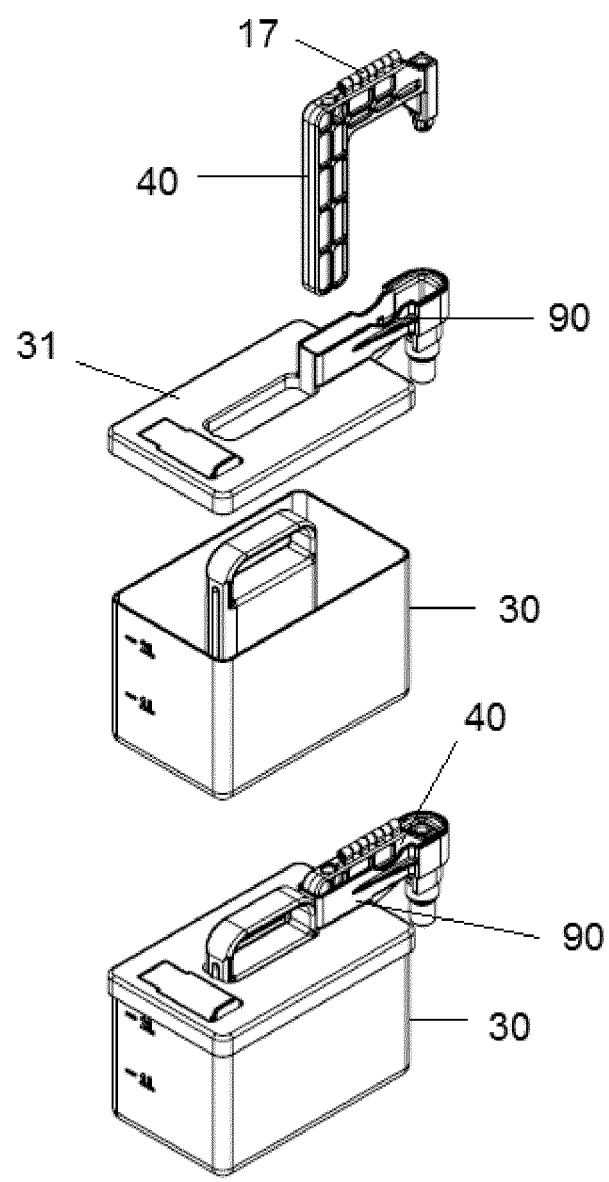
FIGS. 10a-c show different views of the fluid container comprising one or two frothing devices according to the present invention.
Figure 10B:
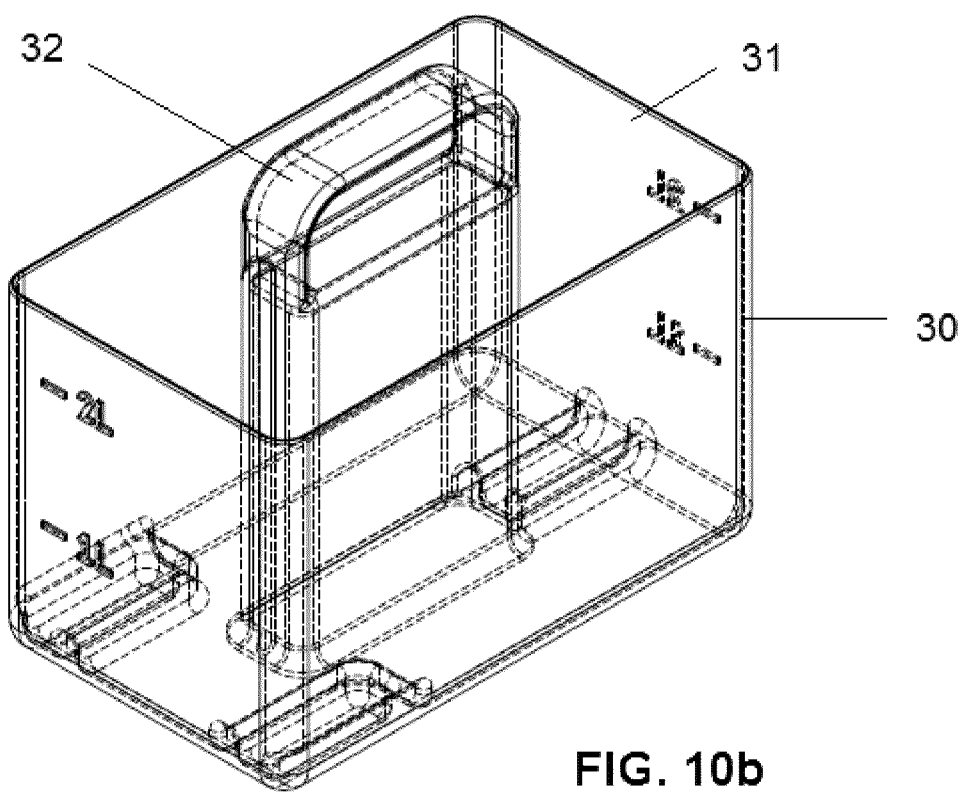
Figure 10C:
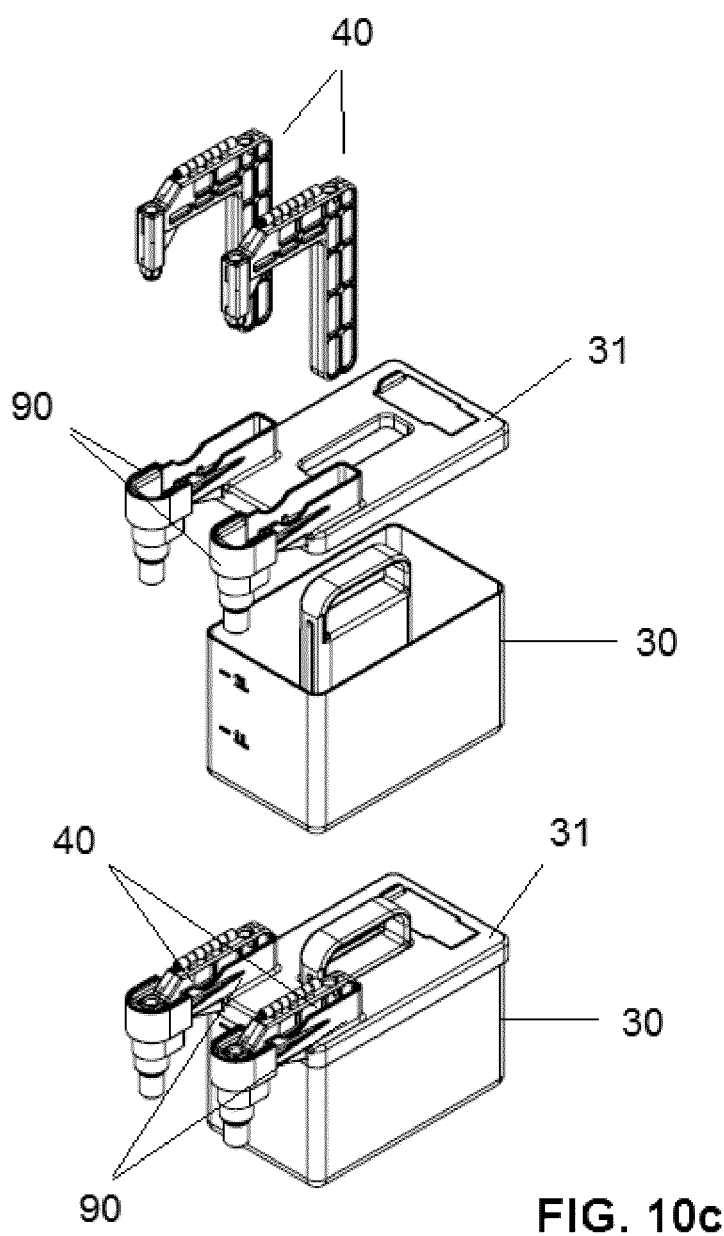

Further embodiments or configurations for the machine 100 are also possible, comprising for example as shown in FIG. 6 two frothing devices 40: the machine 100 will be provided with two foaming receivers 90, one for each frothing device. FIGS. 7*abc* show another possible execution where three frothing devices 40 are provided in the machine 100, which therefore comprises three foaming receivers 90. The machine can comprise several foaming receivers 90 that can receive one or several frothing devices 40, that can be simultaneously used or not. FIGS. 8*abc* show for example a configuration where the machine comprises three foaming receivers 90 though only one frothing device 40. Similarly, FIGS. 9*abc* show a machine having three foaming receivers 90 and two foaming devices 40.

Preferably, the foaming receiver 90 further comprises a frothing cover 500 at the end part of the receiver and connected to the outlet of the frothing device 40: the purpose of this cover 500 is to avoid splashes on the machine when frothing or foaming takes place. Typically, the shape of this frothing cover 500 is circular but any other shape can be used that is designed to be big enough to avoid splashing.

Figure 4A:
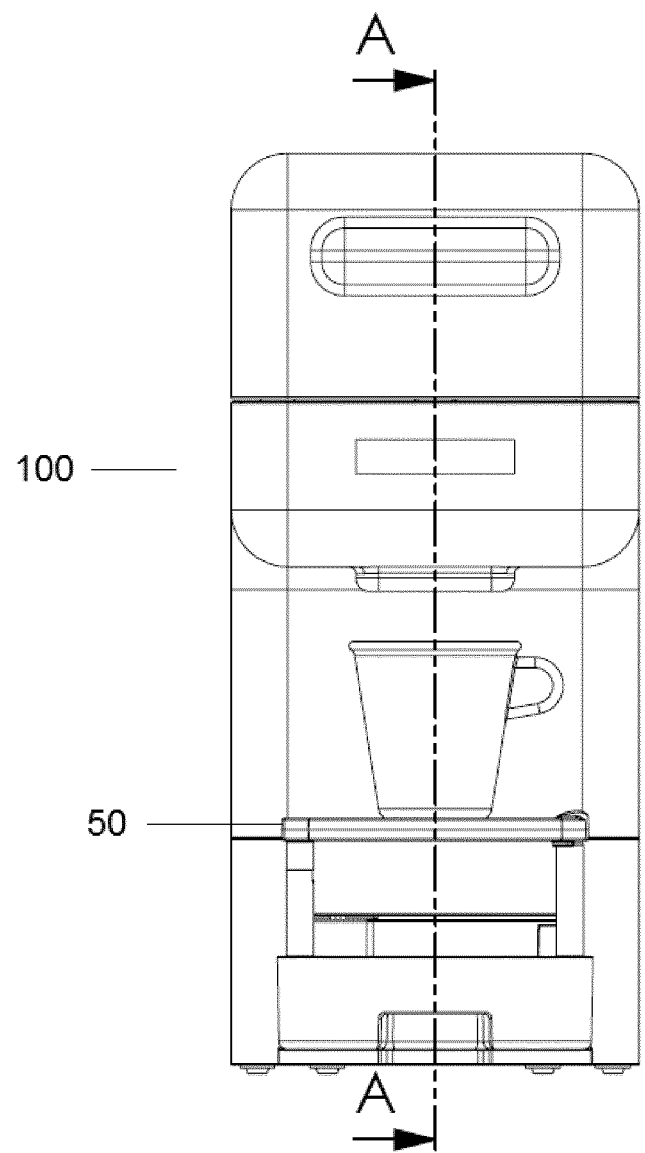
FIGS. 4a-b show a frontal view and a cut view, respectively, of a fluid foaming machine where the frothing device according to the present invention is used.
Figure 4B:
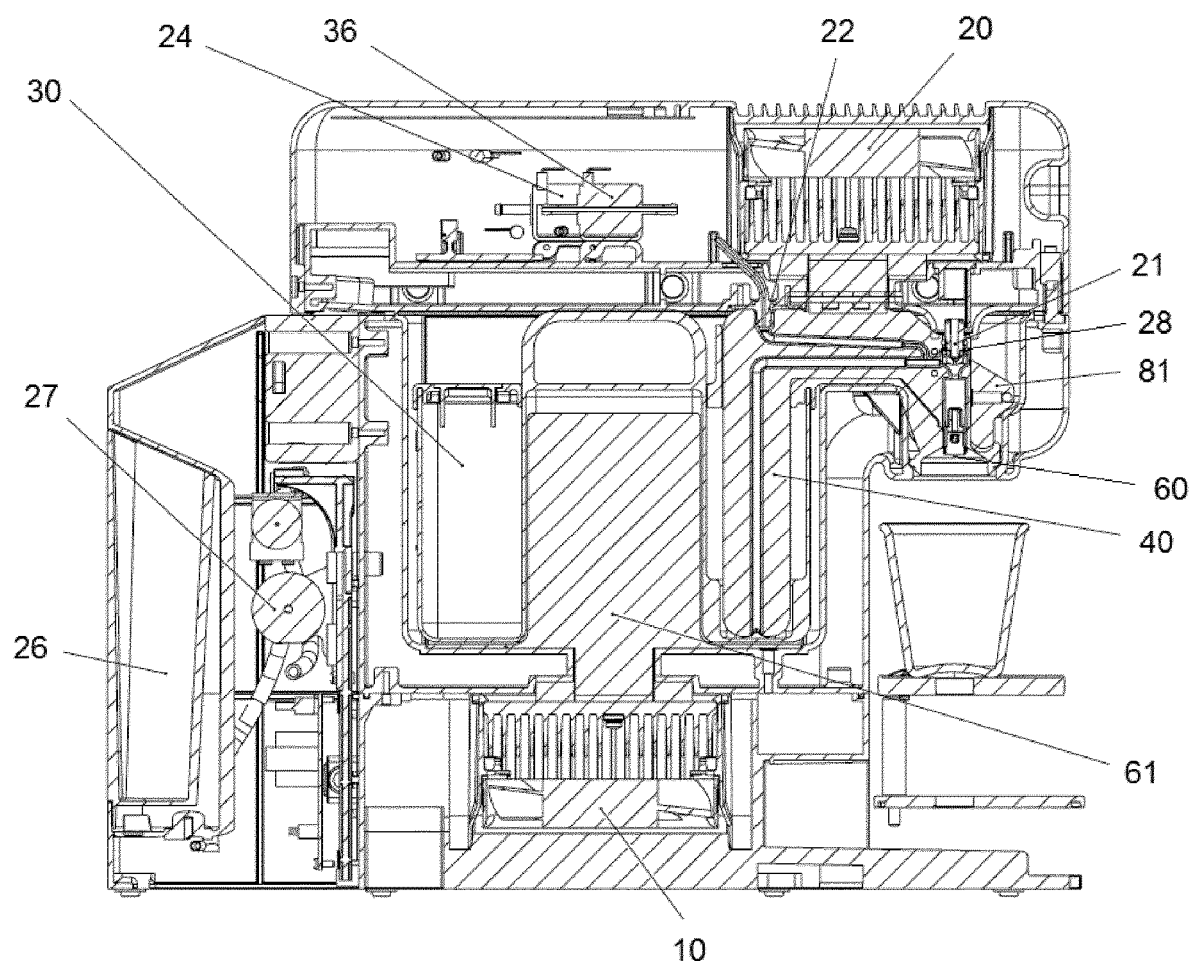

FIGS. 4*a* and 4*b* show a frontal and a cut view of the machine 100: FIG. 4*b* shows the first cooling unit 10 intended to refrigerate the primary refrigerated container for the fluid (milk), and the second cooling unit 20 intended to refrigerate the secondary refrigerated compartment 8 where the frothing device 40 is arranged. The fluid container 30 is also shown in FIG. 4b where the fluid inside its volume is cooled by the cooling walls 62 and also by the cooling block 61 arranged within its cavity 33. As represented in FIG. 4b, the frothing device 40 is in fact refrigerated by means of a metallic cooling block 81 arranged around the frothing device and refrigerated by the second cooling unit 20. This metallic cooling block 81 is also holding the frothing device 40 in place, assuring tightness and its permanent refrigeration. The frothing device 40 is shown having a connection to a steam conduit 21 and to an air conduit 22, through which steam and air are respectively injected.

In the machine, steam is generated by conventional known means: a watertank 26, a waterpump 27 and a thermoblock 38 connected to the steam conduit 21. A security valve 24 is also provided in the machine 100 acting on the opening and closing of the steam conduit 21. Similarly, as already disclosed, the air conduit 22 is connected to a solenoid valve 36 which controls the air injected in the frothing device 40: when only hot milk is desired (that is, no milk foam is targeted), the air entry is cut and only fluid goes through the frothing device, the fluid being then heated by means of the steam injected through the steam conduit 21.

According to different possible embodiments of the invention, it is also possible that the fluid can be heated by other means different from steam, for example using conduction, radiation (using infrared or halogen lamps, for example), hot air, induction, etc.

The machine allows simplified handling and cleaning of the parts involved in the fluid preparation (typically milk): this is possible thanks to these parts being continuously refrigerated; therefore, complex cleaning and rinsing cycles are avoided.

Ideally, the machine 100 comprises two cooling units, one for cooling the fluid tank (first cooling unit 10), and another one for cooling the foaming device (second cooling unit 20).

As an alternative and less expensive solution, the machine 100 can be configured such that it comprises no cooling unit (so the machine is made in fact with a reduced size) and the fluid container and the frothing device are refrigerated externally, in a refrigerator or outside unit: after each milk and/or foam preparation, the fluid container and the foaming device are introduced in an external refrigerator for cooling. Still, the same easy cleaning is possible as the removal of the fluid container and the deployment of the frothing device remain unchanged.

Figure 5A:
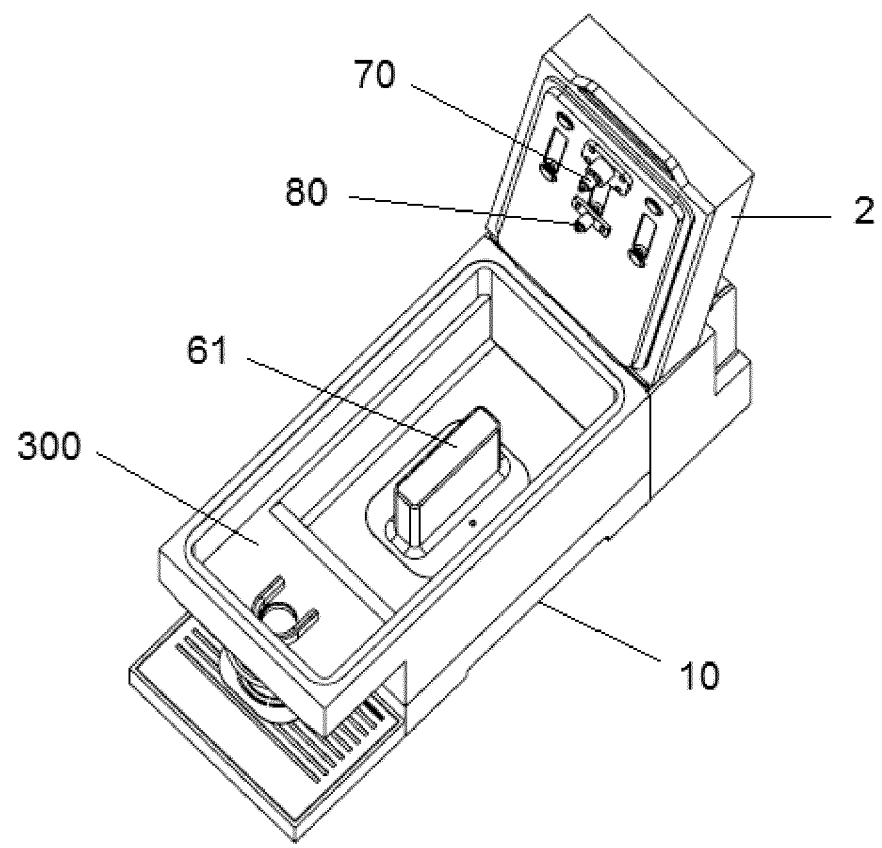
FIGS. 5a-c show different detailed views of a fluid foaming machine where the frothing device according to the present invention is used.
Figure 5B:
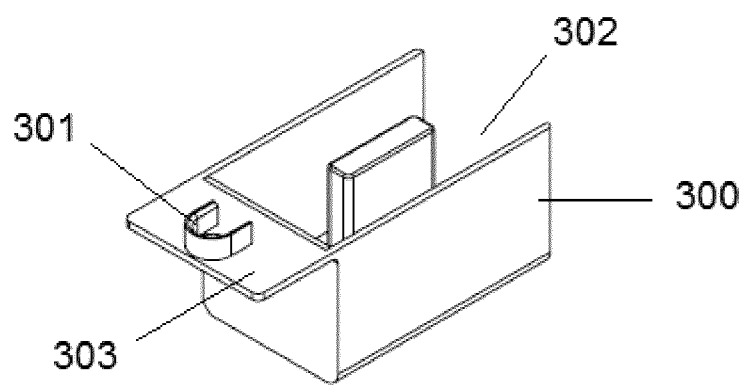
Figure 5C:
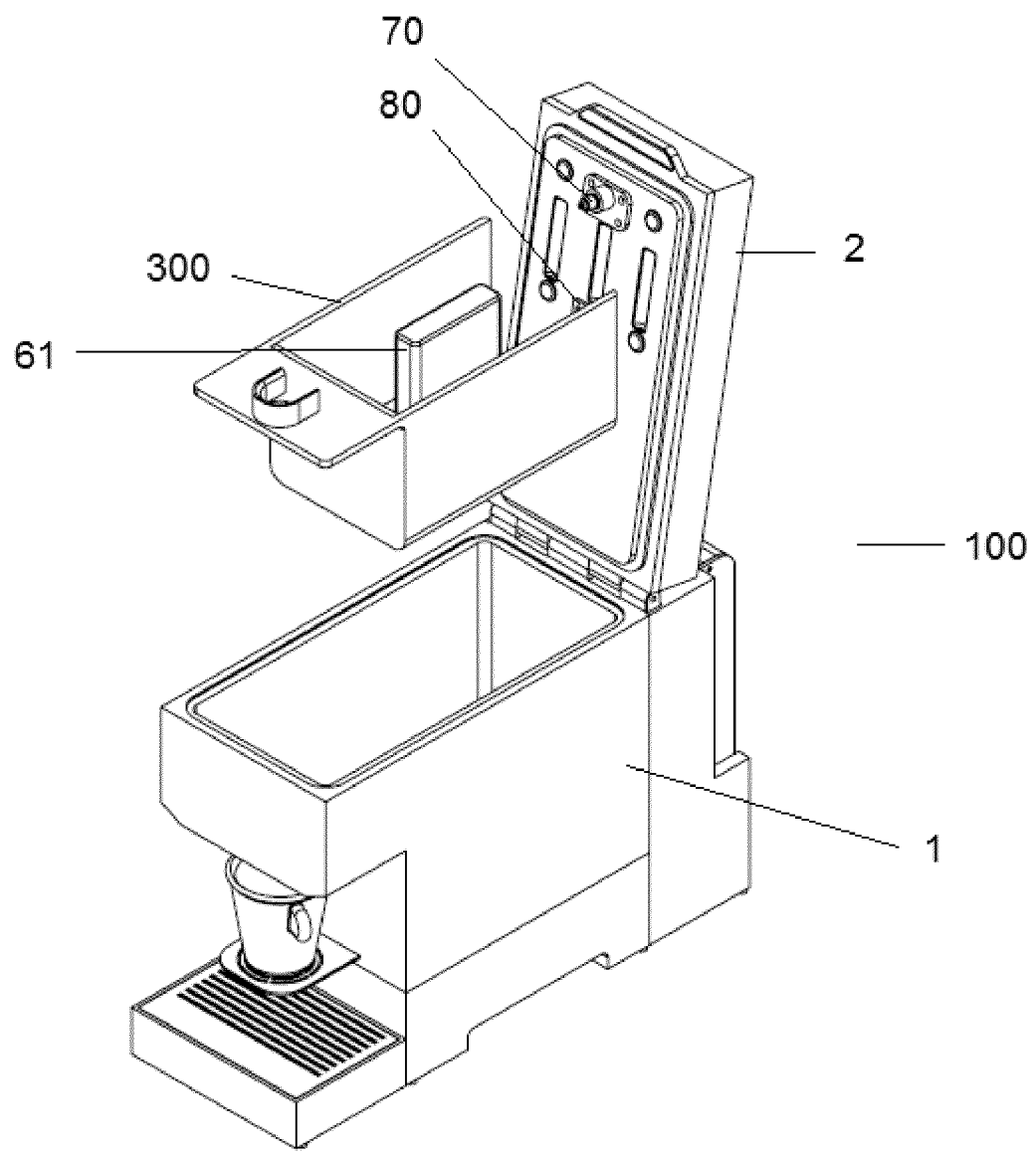
Figure 7C:
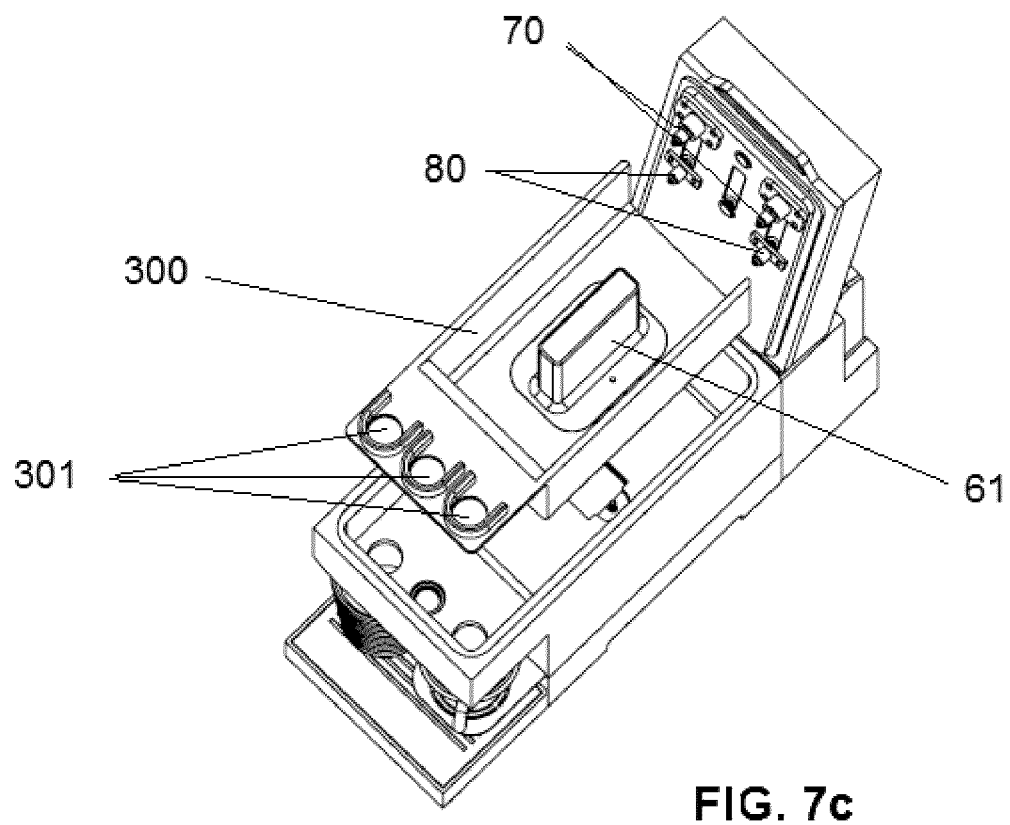

Another variant of the present invention is shown in FIGS. 5a, 5b and 5c attached. According to this variant, there is only one cooling unit 10 arranged in the low part of the housing 1 of the machine. This cooling unit actually cools a block 300 comprising an inner volume 302 where the container 30 with the fluid will be arranged and a wing part 303, also refrigerated, comprising an insert part 301 to receive the outlet nozzle 60 of the frothing device 40. Similar insert part 301 is shown in the embodiment of FIG. 2b, also intended to receive the outlet nozzle 60 of the frothing device 40. Therefore, with this embodiment, only one cooling unit 10 is able to cool from below both the fluid in the container 30 and the frothing device 40 in its outlet. In a similar way, a cooling block 61 is also arranged in the inner volume 302 cooperating with the corresponding cavity 33 in the container 30. The top opening 2 of the machine, as represented in FIGS. 7a and 7c, comprises the steam entry 70 and the air entry 80 that are automatically connected to corresponding matching entries in the frothing device 40. As it is clear, the top opening 2 does not comprise now any metallic block 81, which also presents the advantage of making this top opening 2 much lighter. This embodiment comprises now only one compartment, inner volume 302, corresponding to the primary compartment 6 in the previous embodiment, where the fluid container 30 is arranged.

According to the invention, the air and steam entries are provided directly through the top opening 2 so direct automatic connection to the frothing device 40 is made by simply closing the top opening 2 of the machine. However, it is also possible and should be comprised within the scope of the present invention, that there are connections done manually by the user from the steam and air entries 70, 80 to the frothing device 40.

Figure 3E:
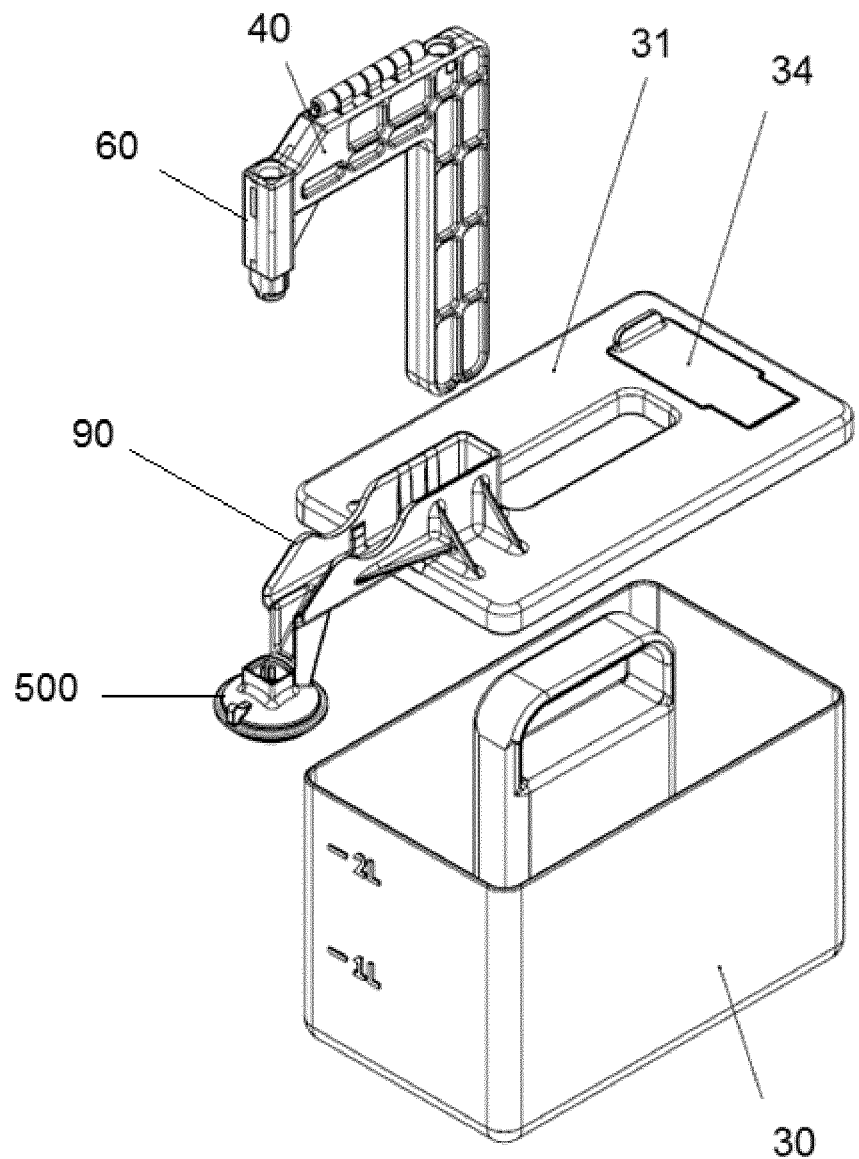

It is also important according to the invention that the frothing device is tightened when arranged at the foaming receiver 90, as shown in FIGS. 3c and 3e, for example. Tightness is indeed necessary for being able to suck fluid by Venturi effect from the fluid container 30 and let it pass through the outlet nozzle 60. Preferably, for obtaining this tightness, the foaming receiver 90 has a shape complementary to that of the frothing device 40.

Although the present invention has been described with reference to preferred embodiments thereof, many modifications and alternations may be made by a person having ordinary skill in the art without departing from the scope of this invention which is defined by the appended claims.

The invention claimed is:

1. A machine for foaming and/or heating a fluid by using a frothing device comprising at least a first body and a second body assembled together to configure the frothing device; at least one of the first body or the second body comprising cavities to configure a plurality of conduits when the first and second bodies are assembled together;
   the plurality of conduits comprising a steam conduit through which steam flows and heats the fluid, a fluid conduit though which the fluid flows by the underpressure created when the steam circulates through the steam conduit, and an air conduit configured to add air to the fluid conduit; and
   the plurality of conduits further comprising an expansion chamber having an internal restriction in section allowing the fluid to be frothed when the air has been added to the fluid conduit,
   the machine comprising a member configured for receiving and closing, in a tight manner, the first and second bodies of the frothing device when the frothing device is arranged in the machine so that a closed fluid system using Venturi effect is created,
   wherein the member configured for receiving and closing the first and second bodies is also configured to refrigerate the frothing device when the frothing device is arranged in the machine,
   the frothing device is connected to a fluid container comprising a cavity cooperating with a first cooling block in a primary refrigerated compartment of the machine, the first cooling block is arranged centered in the primary refrigerated compartment, and the cavity is arranged centered in the container.

2. The machine according to claim 1 comprising a valve controlling entry of the air into the air conduit of the frothing device, such that the air entry can also be totally closed when only hot fluid, not frothed, is targeted.

3. The machine according to claim 1 comprising a plurality of members configured to receive at least one frothing device that can work simultaneously and/or sequentially.

4. The machine according to claim 1 comprising a member configured for injecting the steam and the air into the steam and air conduits when the frothing device is arranged in the machine.

5. The machine according to claim 1 comprising a frothing cover arranged at an outlet of the frothing device when the frothing device is arranged in the machine, the cover being configured to prevent splashes on the machine during beverage preparation.

6. The machine according to claim 1, wherein the fluid conduit further comprises an aspiration tube through which the fluid is conveyed into the fluid conduit, the aspiration tube being configured by cavities in at least one of the first and second bodies when assembled together to configure the frothing device.

7. The machine according to claim 6, wherein the aspiration tube is a separate tube connected to the fluid conduit.

8. The machine according to claim 1, wherein the first and second bodies are joined by a joining element allowing folding and unfolding of the first and second bodies a plurality of times.

9. The machine according to claim 8, wherein the joining element comprises a hinge.

10. The machine according to claim 9, wherein the joining element further comprises at least one clamping element.

11. The machine according to claim 1, wherein the first and second bodies are configured as halves comprising complementary cavities that constitute the plurality of conduits when brought together.

12. The machine according to claim 1, further comprising a sealing part configured for joining of the first and second bodies together.

13. The machine according to claim 12, wherein the sealing part is either molded onto one of the first and second bodies or inserted separately in one of the first and second bodies.

14. The machine according to claim 12, wherein the member configured for receiving and closing the first and second bodies comprises a second metallic cooling block.

* * * * *